Oct. 20, 1942.  M. J. MORGAN  2,299,247
POWER TRANSMISSION UNIT
Filed June 5, 1941  4 Sheets-Sheet 1
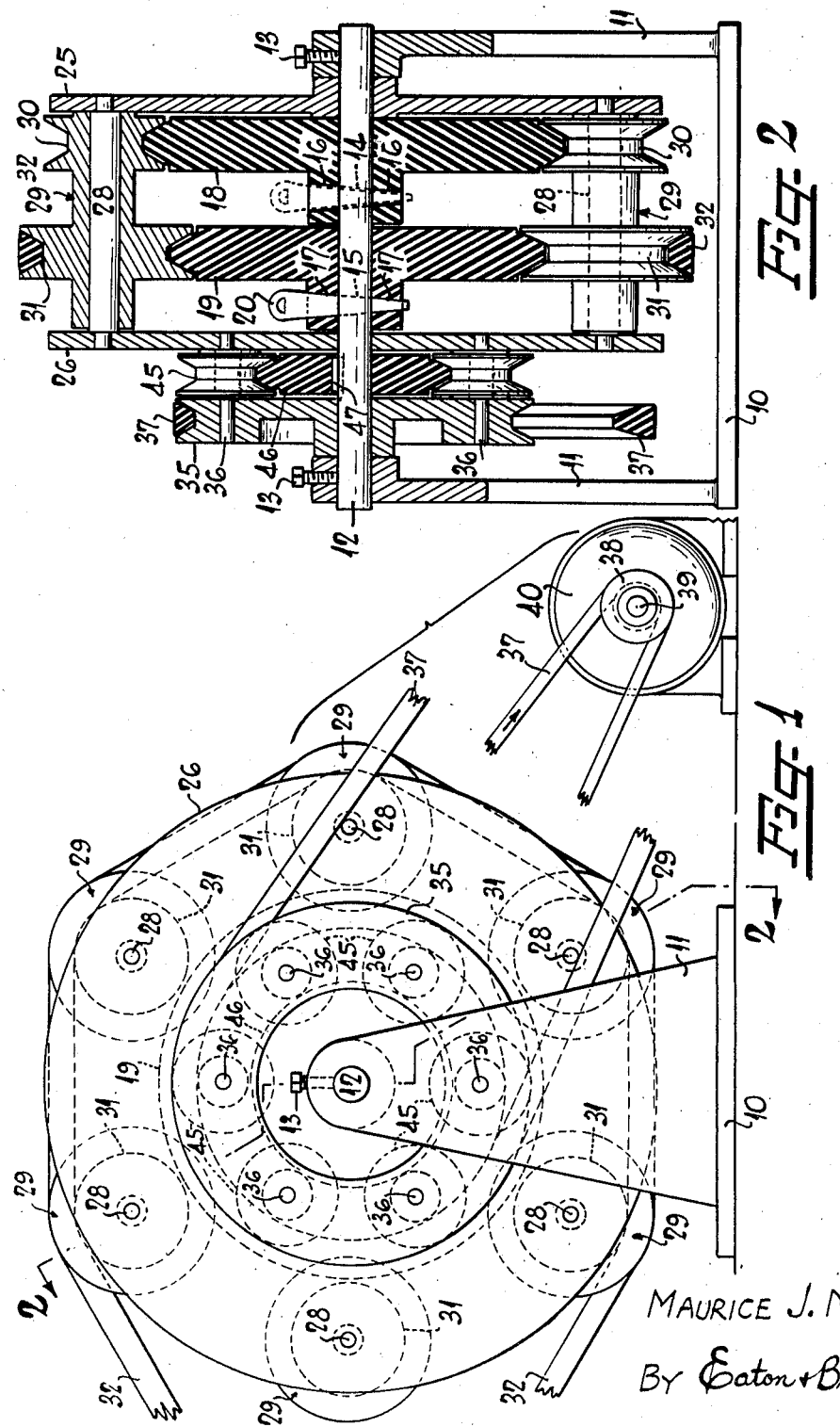
Inventor:
MAURICE J. MORGAN
By Eaton & Brown
Attorneys

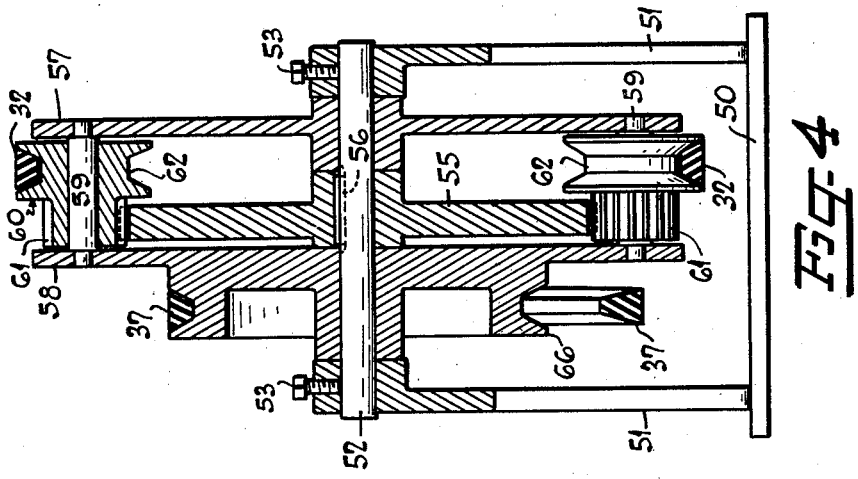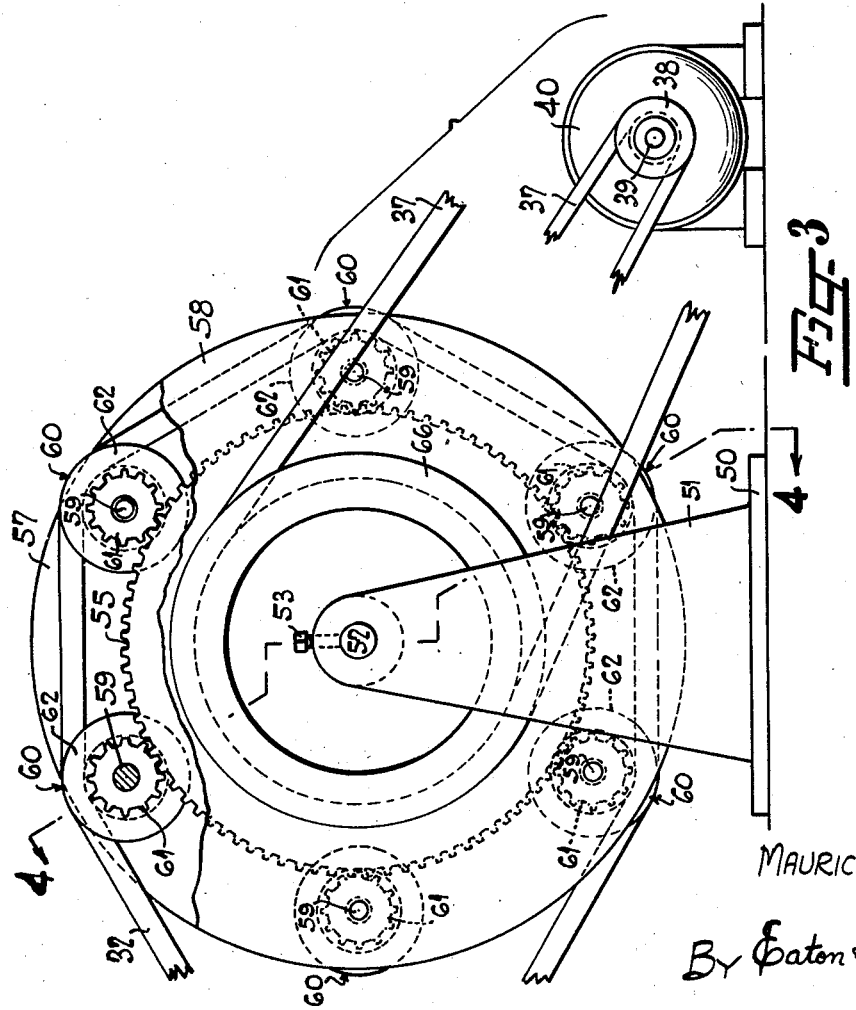

Oct. 20, 1942.  M. J. MORGAN  2,299,247
POWER TRANSMISSION UNIT
Filed June 5, 1941  4 Sheets-Sheet 3

Inventor:
MAURICE J. MORGAN
By
Eaton & Brown
Attorneys

Oct. 20, 1942.　　　M. J. MORGAN　　　2,299,247
POWER TRANSMISSION UNIT
Filed June 5, 1941　　　4 Sheets-Sheet 4

Inventor:
MAURICE J. MORGAN
By
Eaton + Brown
Attorneys

Patented Oct. 20, 1942

2,299,247

UNITED STATES PATENT OFFICE 2,299,247

POWER TRANSMISSION UNIT

Maurice J. Morgan, Charlotte, N. C.

Application June 5, 1941, Serial No. 396,711

12 Claims. (Cl. 74—299)

This invention relates to a mechanical movement and more especially to an improvement in compound power transmission.

One of the objects of this invention is to provide an apparatus of the class described capable of quickly and effectively reducing or increasing the speed of the machine to be driven, whether it is a stationary machine such as a lathe or a moving machine such as an automobile or a tractor.

It is another object of this invention to provide a power transmission unit capable of producing a wide variation of speeds between the input and the output end. By merely changing the position of a key which secures one of a plurality of loosely mounted members in stationary position, speed variations are possible which will answer the needs of almost any driven machine.

The present invention reduces friction in power transmission to a minimum. In one form of the invention, a plurality of rollers are radially disposed with respect to a stationary shaft, said shaft in turn having a roller fixed thereon, which is normally engaged by the radially disposed rollers. A suitable belt or other flexible driving means is adapted to pass over the outer peripheries of the radially disposed rollers. It is therefore seen that as the radially disposed rollers are turned around the fixed rollers, the belt will be driven at a linear speed substantially equal to circumferential speed resulting from the bodily rotation of the rollers, plus the individual circumferential speed of the rollers, resulting from their contact with the stationary roller.

Some of the objects of the invention having been stated, other objects will appear as the description proceeds, when taken in connection with the accompanying drawings, in which—

Figure 1 is an elevation of one form of the invention shown in association with a suitable driving unit such as an electrical motor;

Figure 2 is a transverse vertical sectional view taken along the line 2—2 in Figure 1;

Figure 3 is an elevation, with certain portions thereof broken away and other portions shown in section, illustrating another form of the invention in association with a suitable driving unit such as an electrical motor;

Figure 4 is a transverse vertical sectional view taken along the line 4—4 in Figure 3;

Figure 5:
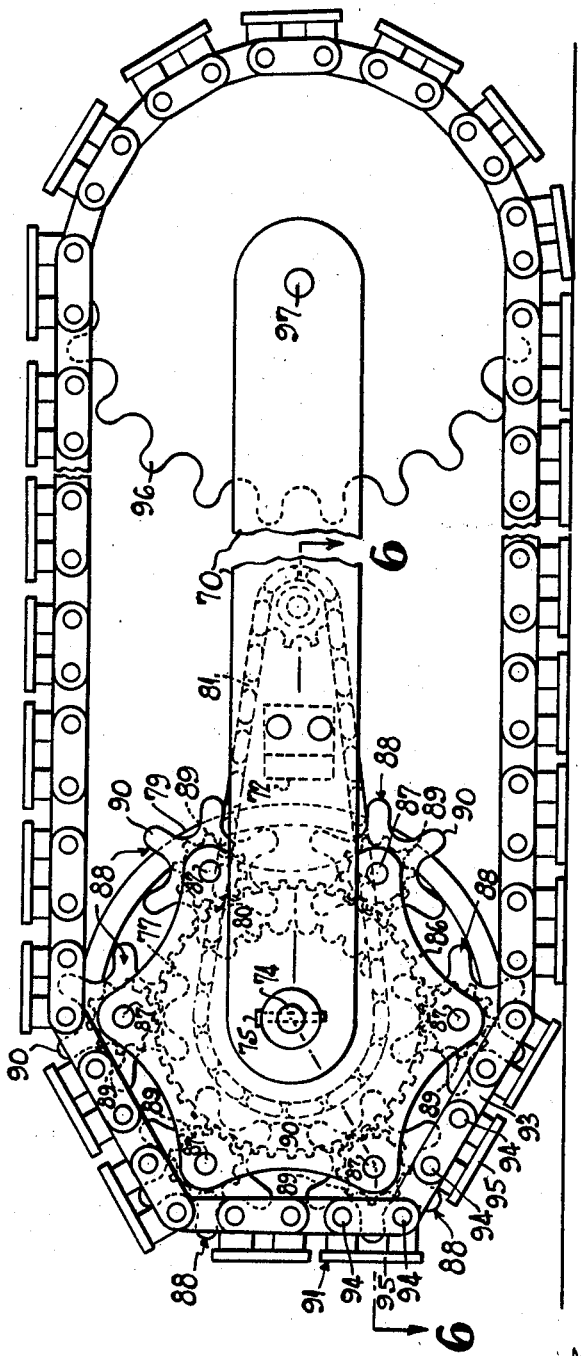
Figure 5 is a side elevation illustrating another modified form of the invention when the same is applied in the capacity of a vehicular wheel for rotating a suitable traction belt.

Referring more particularly to the drawings, the numeral 10 denotes a suitable base having uprisers 11 extending therefrom, the upper ends of which have fixedly secured therein by any suitable means such as set screws 13, a transversely disposed shaft 12. The shaft 12 has wedge shaped slots 14 and 15 therein, which are adapted to coincide at times with other wedge-shaped slots 16 and 17 in the hubs of resilient disk members 18 and 19 respectively, made of rubber or other suitable material. These slots, when in coinciding position, are adapted to receive a suitable key 20 if it is desired to affix one of the disks 18 or 19 to the shaft 12. In the drawings, the key 20 is shown inserted in the slots 15 and 17 to secure the disk 19 in fixed position, but if desired, the key may be removed. When the key 20 is in dotted line position, the disk 16 will be fixedly secured to the shaft 12. In practicing the invention, it is very essential that only one of the disks 18 or 19 be secured to the shaft 12. The reason for this selective fastening of the disks will be later described.

Suitable disks 25 and 26 are rotatably mounted around the fixed shaft 12 and between the standards 11. These disks are held in spaced relation to each other by means of suitable shafts 28, said shafts in the present embodiment of the invention, being arranged substantially in a circle and each having a pulley assembly 29 rotatably mounted thereon. Each pulley assembly has peripheral grooves 30 and 31 therein, the grooves 30 being adapted to roll on the periphery of resilient disk 18 at all times, and the grooves 31 being adapted to roll on the periphery of the disk 19. It is evident from the drawings, that it will be necessary for the grooved portion 30 to be of a smaller diameter than the grooved portion 31, so that the grooves 30 and 31 will properly engage the peripheries of large and small disks 18 and 19, respectively. The outer peripheries of the grooves 30 or the outer peripheries of the grooves 31 are adapted to receive a suitable driving member such as a flexible belt 32. In the drawings, the belt 32 is shown mounted in the grooves 31, but if desired it may be mounted in grooves 30 to produce a different speed. Of course, when the belt is shifted from grooves 31 to grooves 30, the key 20 if desired may be transferred from the slots 15 and 17 to the slots 14 and 16 so that the disk 18 will be fixed on the shaft 12 and the disk 19 will be free to rotate thereon to give a different result in speed. If both disks were fixed on the shaft 12, the grooved portions 30 and 31 would not be free to bodily rotate, because the peripheral speed of the grooved portions are different, therefore a binding would occur.

The disks 25 and 26 together with their associated pulley assemblies 29 are rotated around the shaft 12 by means of a suitable grooved wheel 35, said grooved wheel 35 being secured to the face of disk 26 by any suitable means such as pins 36. Upon this grooved wheel 35, a suitable traction belt or other suitable driving means 37 is adapted to be mounted. Traction means 37 is also mounted upon a motor pulley 38 which in turn is mounted on motor shaft 39 of motor 40.

The pins 36 are arranged substantially in a circle and around each pin is rotatably mounted a grooved roller 45, each of said rollers being adapted to have peripheral contact with a center stationary disk 46. In the present embodiment of the invention, the disk 46 is preferably made of the same material as the disks 18 and 19, that is of some resilient material such as hard rubber which will supply the proper friction or bond with the pulley 45 during the operation of the apparatus. This stationary disk 46 is fixedly secured to shaft 12 by any suitable means such as key 47. The belt 37 may be transferred to the grooved pulleys 45 if it is desired to produce a speed variation hereinafter to be described.

Let us assume that the motor pulley 38 is rotated in a clockwise direction and that the belt 37 is mounted on this pulley, as well as on the grooved wheel 35 in the manner shown in the drawings. The rotation of the motor pulley 38 will impart clockwise rotation to the wheel 35 and to the disks 25 and 26, as well as the associated pulley assemblies 29. If the belt 32 is disposed upon the outer peripheries of the grooved portions 31, as shown in Figures 1 and 2, and if the key 20 is inserted in the slots 15 and 17 to hold the disk 19 in stationary position on shaft 12, the clockwise rotation of the disks 25 and 26 will cause the pulley assemblies 29 to bodily rotate around fixed shaft 12 as a center. At the same time, each assembly 29 will be individually rotated about its axis 28 at a speed determined by fixed disk 19. Therefore, the linear speed of the belt 32 will be the resultant of the bodily rotation of the assemblies 29 around the fixed shaft 12, plus the added peripheral speed of an individual assembly, resulting from the contact of groove 31 with the periphery of the stationary disk 19.

If it is desired to change the linear speed of the belt 32, it is only necessary to transfer the key 20 from slots 15 and 17 to slots 14 and 16 and at the same time allow belt 32 to remain in grooves 31. With the parts in this last-named position, the same rotation of the motor shaft 39 will produce a corresponding change in linear speed of the belt 32. Of course, when the key 20 is removed from slots 15 and 17 the disk 19 will be free to rotate on the shaft 12 while engaging the peripheries of grooves 21. Another speed may be obtained by putting key 20 in slots 14 and 16 and transferring belt 32 to grooves 30. Still another speed may be obtained by putting key 20 in slots 15 and 17 and placing belt 32 in grooves 30. Regardless of which set of grooves 30 or 31 in which the belt 32 operates, there will be an increase of linear speed of belt 32 over the linear speed of belt 37 as long as the belt 37 engages the grooved wheel 35.

If on the other hand it is desired to decrease the linear speed of belt 32, that is to have belt 32 travel at a slower linear speed than the belt 37, it will be necessary to transfer belt 37 from the grooved wheel 35 to the grooved pulleys 45. With the belt 37 on the rollers 45 there will be a corresponding reduction in the rate on rotation of the disks 25 and 26 and the grooved pulley assemblies 29 and of course this reduction will effect the linear speed of the belt 32. By having a plurality of grooved rollers 45 alongside the grooved wheel 35, it is possible to use this transmission unit for reducing belt speeds as for increasing without reversing the position of the unit.

In describing more fully the speed variations possible through the selective fastening of disks 18 and 19 by means of key 20, let us assume that the diameter of disk 18 is 8", groove 30 in roller 29 is 2", disk 19 is 6" and groove 31 in roller 28 is 4". With the belt 32 operating from groove 31, we place key 20 in slots 15 and 17, holding disk 19 stationary to shaft 12, thereby creating friction between groove 31 and disk 19. Roller assemblies 29 of which groove 31 is a part will rotate around disk 19 and belt 37 from motor 40 will engage pulley 35, causing disks 25 and 26 to rotate. Each revolution of disks 26 and 25 or pulley 35, causes rollers 29 to revolve around disk 19 one and one-half revolutions due to the ratio of 1 to 1½ in the periphery of the two disks. The linear speed of belt 32 is therefore 62.8 inches per revolution of disks 25 and 26 or pulley 35. The linear speed is equal to the periphery of the combination of rollers 29 plus one and one-half revolutions of pulley groove 31 on its axis 28.

We now change key 20 from slots 15 and 17 to slots 14 and 16, releasing friction from disk 19 and placing friction between groove 30 and disk 18 which is now stationary. The ratio of the diameter of groove 30 and disk 18 is now reversed from 1 to 1½ to 1 to 4, therefore to each revolution of disks 25 and 26, rollers 29 make four revolutions around disk 18. We therefore have a linear speed of belt 32 of 94.2 inches per revolution of disks 25 and 26, as we maintained the same over all peripheries of rollers 29 plus four revolutions of disk 31 on its axis 28.

The above illustration demonstrates two speeds possible by merely changing key 20 from slots 15 and 17 to 14 and 16. It can be seen that additional speed changes are possible by increasing the number of grooved pulleys on assemblies 29 with correspondingly center disks of various diameter ratios controlled by key 20. The above illustrations are made when belt 37 supplies power to pulley 35. By changing belt 37 to roller pulleys 45 further reduced speeds may be obtained and more power added as this hook up reduces the speed of complete unit disks 25 and 26 in proportion to ratio of roller pulleys 45 to center stationary disk 46.

It can further be seen that by changing belt 32 from one set of grooved pulleys to another set such as 31 and 30, still further linear speed variations of belt 32 are possible merely by shifting key 20 from one center disk to another.

It can further be seen that motor pulley 37 may be applied to any grooved pulley on assemblies 29, such as 30 or 31 and belt 32 may be applied to either pulleys 35 or 45 or to any other pulleys on rollers 29. This wide variation of power transmission and the resultant numerous linear speeds obtained from the output pulley 32 makes it possible to obtain linear pulley speeds from one standard unit applicable to almost any rotary machine, eliminating almost entirely the necessity of changing belts.

Figures 3 and 4 show a slightly modified form of the invention which operates on substantially the same principle; however, it is a desired form when a more positive drive is necessary. Also this form provides a means for producing a further variation in the speed between the input and the output sides of the transmission unit.

This form of the invention comprises a base portion 50 having spaced standards 51, the upper ends of which have fixedly secured therein, a shaft 52 by any suitable means such as set screws 53. The intermediate portion of the shaft 52 has fixed thereon, a suitable gear 55 by any suitable means such as a key 56.

Also mounted around the shaft 52 are spaced disks 57 and 58 said disks being free to rotate around the shaft, and being spaced apart from each other by any suitable means such as cross shafts 59. The cross shafts 59 are arranged substantially in a circle in the present embodiment of the invention and serve as bearings for suitable gear pulley assemblies 60. Each of the gear pulley assemblies 60 has a pinion 61 which meshes with the teeth in the periphery of fixed gear 55. Also each of the gear pulley assemblies has a grooved pulley 62 for receiving a belt 32. Since the belt 32 does not rotate on the periphery of the pinions 61, it is quite evident that the diameter of the groove 62 will determine, to a large extent, the linear speed of the belt 32. For example, if it is desired to produce an increased linear speed of the belt 32, it will be necessary to increase the diameter of grooved pulley 62. Likewise, if it is desired to decrease the speed, the diameter of the pulley 62 must be correspondingly decreased. Of course, it is necessary for the belt 32 to be mounted on a plurality of grooved pulleys in order to provide the desired circumference for the rotation of the belt.

It will also be noted that the disk 58 has a grooved pulley 66 integral therewith for the reception of belt 37 previously described. When the belt 37 is mounted on the grooved pulley 66 as shown in the drawings, and when the motor 40 is placed in operation, the members 66, 57, and 59 and 60 will be caused to rotate as a unit, around the fixed shaft 52. During this rotation the gear 55 will be held in stationary position and therefore an additional rotation will be imparted to the gear pulley assemblies 60 on account of the pinions 61 meshing with the central stationary gear 55.

Figure 6:
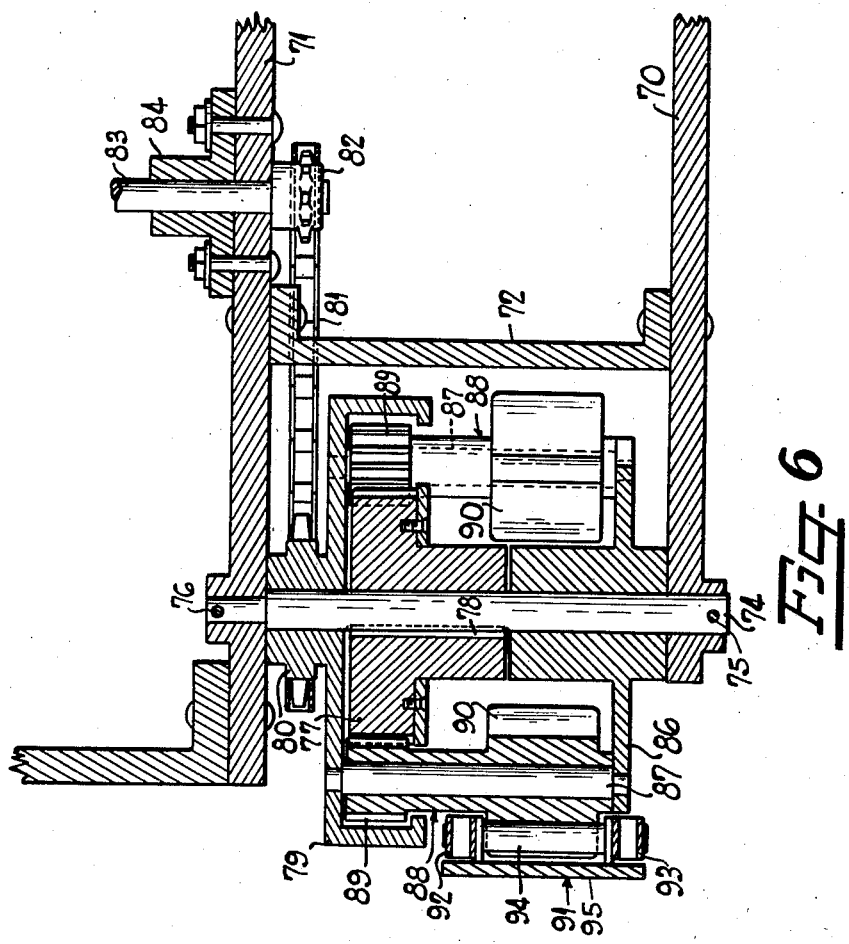
Figure 6 is a sectional plan view taken along the line 6—6 in Figure 5.

Figures 5 and 6 show a modified form of the invention applied to a suitable traction device such as a tractor or other moving vehicle. In these figures, the reference characters 70 and 71 designate the longitudinal struts forming a part of the chassis or framework of an implement such as tractor, said struts being held in spaced relation by any suitable means such as braces 72, one of which only being shown. It is evident that there must be other portions of the framework in order to make a completed chassis for a tractor or other vehicle. However, it is thought that the portions shown are sufficient to illustrate the principle upon which the present intion operates.

Referring to Figure 6 it is seen that a suitable shaft 74 is held in fixed position in the members 70 and 71 by any suitable means such as pins 75 and 76. Fixedly secured on the intermediate portion of the shaft 74 is a gear 77 by any suitable means such as a key 78. The fixed shaft 74 has rotatably mounted thereon, adjacent the face of the gear 77, a suitable disk or housing 79 which housing has integral with the outer face, a suitable sprocket 80, upon which a chain 81 is mounted. This chain is also mounted upon a second sprocket 82 on shaft 83 which in turn is rotatably mounted in the strut 71 and a bearing 84 (Figure 6). Shaft 83 is driven from a suitable source of power, not shown. When the shaft rotates, power is transmitted by way of sprocket 82, chain 81 and sprocket 80 to the disk or housing 79.

Rotatably mounted on the fixed shaft 74 is another disk 86. This disk is disposed on the opposite side of gear 77 from the side upon which disk 79 is located. In order to hold the two disks together in spaced relation to each other, a plurality of short shafts 87 is provided and these shafts are arranged substantially in a circle whose center is the shaft 74. Upon each of the shafts 87, a suitable gear assembly broadly designated by the reference characters 88 is rotatably mounted. One end of each gear assembly has a small pinion 89 integral therewith meshing with the fixed gear 77. The other end of the gear assembly 88 has a larger gear 90 therein, preferably with coarse teeth, upon which a suitable traction belt 91 is adapted to pass. It will be noted that the traction belt 91 comprises a pair of spaced parallel chains 92 and 93 separated by suitable spaced cross pins or links 94, said pins being adapted to fit between the teeth of the gears 90 as the belt passes thereover. Each pair of pins 94 has secured thereto a suitable traction plate 95, which serves as a bearing surface between the wheel assembly and the surface upon which the tractor is moving. The traction belt 91 is also mounted upon a large sprocket 96 which in turn is rotatably mounted as at 97 upon strut 70.

The operation of this form of the invention is very similar to the operation of the form shown in Figures 3 and 4. When the shaft 83 is driven by a suitable source of power such as a motor, the disks 79 and 86 are rotated carrying with them the shafts 87 and the gear assemblies 88. As rotation is imparted to these assemblies the pinions 89 will be rotated by fixed gear 77 and therefore an increased peripheral speed will be imparted to the traction belt 90 in addition to the bodily rotation of the entire wheel assembly.

In the drawings and specification, there has been set forth a preferred embodiment of the invention, and although specific terms are employed, they are used in a generic and descriptive sense only and not for purposes of limitation, the scope of the invention being set forth in the following claims.

I claim:

1. A power transmission unit comprising a fixed shaft having a stationary disk mounted thereon, a pair of second disks rotatably mounted on said shaft, one of said second disks being disposed one on one side of the stationary disk and the other of said disks being disposed on the opposite side, and a plurality of rollers rotatably mounted between said second disks and being operatively connected to said stationary disk, whereby each of the rollers will rotate bodily about the fixed shaft and also about its own axis when the second disks rotate, a belt adapted to simultaneously engage at all times the outer peripheries of at least two adjacent rollers as the second disks rotate, and a second belt operatively connected to one of said second disks.

2. In combination, a stationary disk on a fixed shaft, a second disk rotatably mounted on said shaft, and a plurality of rollers arranged in a circle on said second disk, said roller engaging the periphery of the stationary disk whereby each of the rollers will rotate bodily about the fixed shaft and also about its own axis when the second disk rotates, a flexible driving means adapted to simultaneously engage at all times the outer peripheries of at least two adjacent rollers as the second disk rotates, and a second flexible driving means operatively connected to said second disk.

3. In combination, a stationary disk on a fixed shaft, a second disk rotatably mounted on said shaft, a plurality of rollers arranged in a circle on said second disk and being operatively connected to said roller engaging the periphery of the stationary disk whereby each of the rollers will rotate bodily about the fixed shaft and also about its own axis when the second disk rotates, a flexible driving means adapted to simultaneously engage at all times, the outer peripheries of at least two adjacent rollers as the second disk rotates, and a second flexible driving means operatively connected to said second disk.

4. In combination, a fixed shaft, a stationary resilient disk fixedly mounted on said shaft, a second disk rotatably mounted on said shaft, a plurality of grooved rollers arranged in a circle on the second disk, the periphery of each grooved roller frictionally engaging the periphery of the stationary disk, whereby each of the rollers will rotate bodily about the fixed shaft and also about its own axis when the second disk rotates, a flexible driving means adapted to simultaneously engage at all times the outer peripheries of at least two adjacent rollers as the second disk rotates, and a second flexible driving means operatively connected to said second disk.

5. A power transmission unit comprising a fixed shaft, having a stationary gear mounted thereon, a pair of disks rotatably mounted on said shaft, one of said disks being disposed on one side of the gear, and the other of said disks being disposed on the opposite side, a plurality of pinions rotatably mounted between the disks and meshing with said fixed gear, a second pinion driven by each of said first named pinions, whereby each of the pinions will rotate bodily about the fixed shaft and about its own axis as the disk rotates, and a traction belt adapted to simultaneously engage at all times at least two adjacent second pinions as the second disk rotates.

6. A power transmission unit comprising a fixed shaft having a stationary gear mounted thereon, a member rotatably mounted on the fixed shaft, a plurality of pinions rotatably mounted on said member and meshing with said fixed gear, a second pinion driven by each of said first-named pinions, whereby each of the pinions will rotate bodily about the fixed shaft and individually about its axis as said member rotates, and a traction belt adapted to simultaneously engage at all times at least two adjacent second pinions as said member rotates.

7. A power transmission unit comprising a fixed shaft having a stationary gear mounted thereon, a member rotatably mounted on the fixed shaft, a plurality of toothed members arranged in a circle and rotatably mounted on said first member and also being driven by said fixed gear as the first member rotates, and a traction belt adapted to simultaneously engage at all times the outer peripheries of a plurality of said toothed members when said first member rotates on the fixed shaft.

8. A power transmission unit comprising a fixed shaft having a pair of disks of different diameters mounted thereon, means for selectively fixing said disks on said shaft, a member rotatably mounted on said shaft, a plurality of radially disposed roller units on said member, each of said roller units having a large and small periphery normally engaging the small and large diameter disks respectively whereby each of the roller units will rotate bodily about the fixed shaft and individually about its axis when said member rotates, and a traction belt adapted to simultaneously engage at all times the outer peripheries of at least two adjacent roller units as said member rotates.

9. A power transmission unit comprising a fixed shaft having a pair of friction disks of different diameters mounted thereon, means for selectively fixing said disks on said shaft, a member rotatably mounted on said shaft, a plurality of radially disposed roller units on said member, each of said roller units having a larger and small periphery normally and frictionally engaging the small and large diameter disks respectively whereby each of the roller units will rotate bodily about the fixed shaft and individually about its axis when said member rotates, a traction belt adapted to simultaneously engage at all times the outer peripheries of at least two adjacent roller units as said member rotates, and a second belt operatively connected to said member.

10. A power transmission apparatus comprising a driven member mounted for rotation upon a transverse axis, a plurality of members rotatably mounted near the periphery of the driven member upon axes parallel to the axis of the driven member, a plurality of friction members loosely mounted for rotation on the same axis as the driven member and having frictional contact with the plurality of rotary members, a belt mounted on the plurality of rotatably mounted members and selectively operable means for selectively connecting any one of the loosely mounted members to the first axis to prevent rotary movement thereof.

11. A power transmission apparatus comprising a fixed shaft, a member loosely mounted for rotation on said shaft, a plurality of tubular members, each having a plurality of belt pulleys thereon and being rotatably mounted in a circle and disposed around the periphery of the first member, a plurality of friction disks mounted on the shaft and having frictional contact with said pulleys, a second set of belt pulleys rotatably mounted on the driven member, a friction disk fixed on said shaft and having frictional contact with the second set of pulleys and means for selectively connecting the loosely mounted friction disks to said shaft to thereby produce a different speed differential.

12. A power transmission apparatus comprising a fixed shaft, a member rotatably mounted on said shaft, a plurality of pulleys located on the member and arranged concentrically on said shaft, a belt on said pulleys, a friction disk mounted on said shaft and having frictional contact with said pulleys, a plurality of rotary members arranged circumferentially of said shaft and being disposed on said rotary member, each of said rotary members having a plurality of pulleys integral therewith, a plurality of friction disks loosely mounted on said shaft and having frictional engagement with said last named pulleys and selectively operable means for affixing one at a time said last named friction disks to said shaft.

MAURICE J. MORGAN.